J. WILLIAMS.
BOARD GAME AND APPLIANCES THEREFOR.
APPLICATION FILED OCT. 30, 1918.
1,304,431.
Patented May 20, 1919.
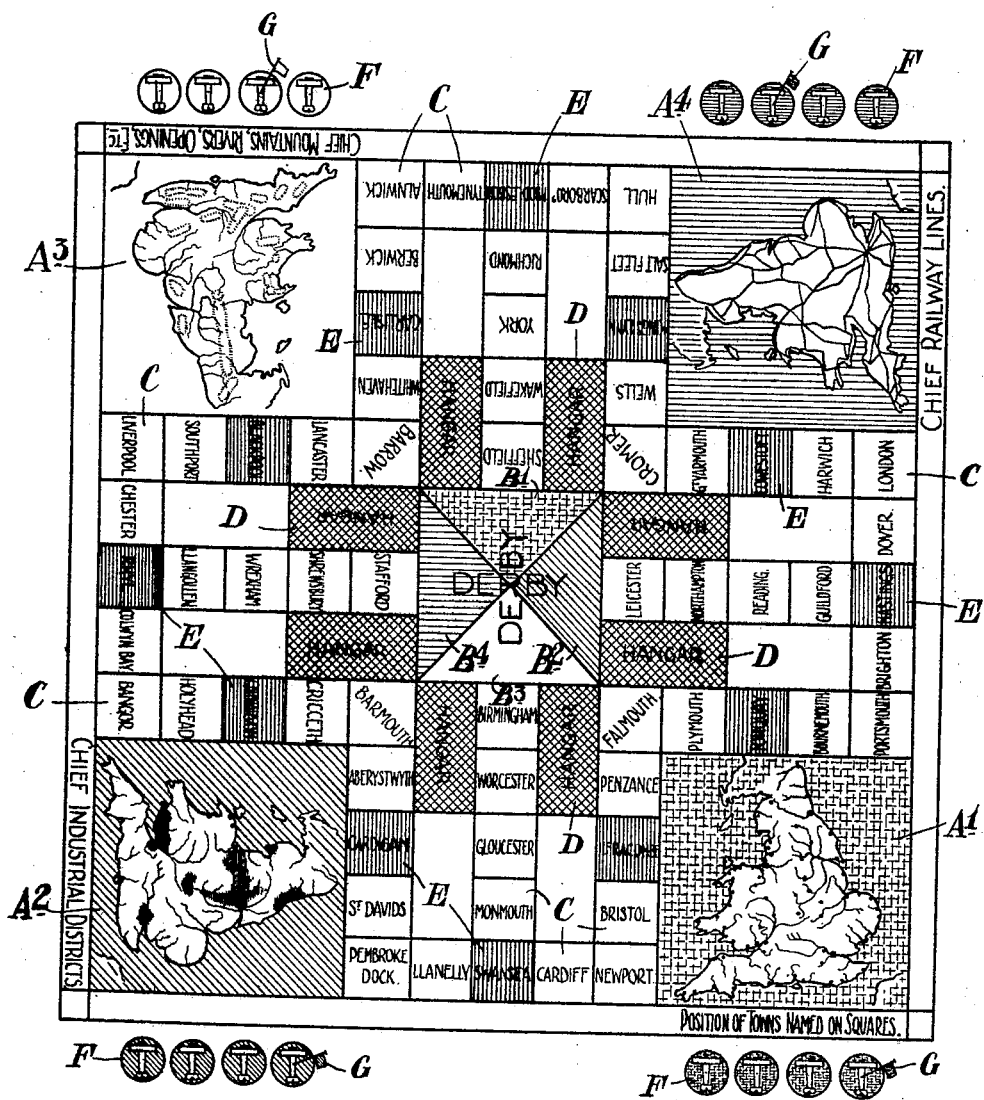
Inventor:
Jeremiah Williams,
by Dodge and Sons,
Associate Attys.

UNITED STATES PATENT OFFICE.

JEREMIAH WILLIAMS, OF ABERGELE, WALES.

BOARD-GAME AND APPLIANCES THEREFOR.

1,304,431.
Specification of Letters Patent. Patented May 20, 1919.

Application filed October 30, 1918. Serial No. 260,412.

*To all whom it may concern:*

Be it known that I, JEREMIAH WILLIAMS, M. A., a subject of the King of Great Britain, residing at Abergele, North Wales, have invented certain new and useful Improved Board-Games and Appliances therefor, of which the following is a specification.

My invention relates to a set of appliances for playing a racing game which is amusing and at the same time of instructive and educational value.

The appliances comprise a board divided up into squares and other areas as hereinafter provided; also a certain number of disks or racing pieces; which may for example represent aeroplanes, for each player; a cup and dice or a block or cube with figures or spots on its faces; and flags or other distinguishing marks to apply to racers that have reached or passed certain points in their prescribed course.

The board and other appliances for playing the game are illustrated in the accompanying drawing.

At each corner of the board is a large square A', A², A³, A⁴ each of a distinctive color. The center of the board is occupied by a square divided into four equal triangles B', B², B³, B⁴, each of a distinctive color corresponding to those of squares A', A⁴. Right around the edge of the board, except the parts occupied by the large squares, and also around the inner sides of the large squares, and running up from the edge of the board toward the center of the base of each of the triangles at the center are small squares C. In the drawing these are 52 in number.

On either sides of two of the small squares running up to the triangles and touching the triangle is an oblong space D (thus making eight oblongs altogether). These oblong spaces occupy a prominent part in the playing of the game.

Each small square around the board and around the inner sides of the large squares may represent a geographical entity, such as a British coast town, while those running up the middle toward the triangles represent British inland towns. Each town named may have a date, a name, a historical event, or name of an industry connected with it added, so that such may become inseparably associated in a player's mind with the name of that town.

Every fourth small square E beginning with a middle square at the edge of the board, is of a distinctive color, unlike any other color used on the board and represents a safe refuge where no aeroplane racer can be interfered with by an opponent.

The racers F on their course pass through or over the "towns" marked in the small squares C and after going right around the board, according to the rules of the game, go up the middle squares to their home triangle B', B², B³, B⁴.

The oblong spaces D are all of one distinctive color and are called "hangars" when the racer used is of the aeroplane type. Planes interfered with by the opponents have to return to certain hangars until such time as they are permitted by the rules of the game to resume their course.

Racers usually move from right to left around the board. In this case the planes owned by a player occupy before starting the large square or "aerodrome" e. g. A' to the right of the player, the ground color of which aerodrome should correspond to the color of the players' planes and to the color of the players' "home" triangle B'. When according to the rules of the game a plane is able to start it is brought out on to the distinctive colored small square immediately facing the player at the edge of the board.

The planes are moved according to the result of throwing dice or the tossing of a marked block or cube.

To make the game still more instructive and of educational value the large corner squares A', A², etc., may have maps showing the real position of the towns indicated in the small squares, the railways of the area, the agricultural districts, industrial centers, physical features or any other matters of interest.

The towns, maps and the like may be those of any country. Instead of aeroplanes other types of racing pieces e. g. motor cars, bicycles or animals may be used, and the terms "aerodrome" and "hangar" would then have to be changed into "garage" and so on to suit the particular type of racer chosen.

In playing the game, each player has for example four aeroplanes. The one having the four yellow planes should sit with the yellow triangle B' facing him on the far side of the large middle square on the board, and with the yellow ground large square A' to his right for his aerodrome, and so on with each player according to color chosen. The starting point for the race is the red square facing each player and to the left of his aerodrome. The players cast the dice in turn each one having to toss up a "five" before he can bring out an aeroplane from his aerodrome and place it on his starting point ready to begin racing. If a person casts up a second "five" before moving a plane from his starting point he can put a second plane in the same square as the other at the starting point. At no other point except his home triangle can a player have two planes in the same space. The players race the planes of their opponents around the squares C representing the coast towns of England and Wales, moving one plane each time as many squares as indicated by the number tossed up on the dice.

The object of each player is to get all his planes right around the coast and back to his starting point, then up the center to the heart of England and on to his home triangle before anyone else gets all his planes "home".

Suitable rules are framed for playing the game such as the following:—

(1) If after casting the dice the player finds he can with one of his planes overtake a plane of an opponent (that is bring his plane to a town square C occupied by another's plane) he can occupy the square with his own plane and send the opponent's machine back to the last hangar D that it passed.

(2) A player who does not overtake and drive back an opponent's plane (as in rule 1) when he gets the chance, has his plane sent all the way back to his aerodrome, which it cannot leave to make a fresh start until its owner casts up "five".

(3) The squares E are "safe places" so a plane occupying such square cannot be turned back, and of course, not more than one plane can be resting in the "safe place" at one time.

(4) When a plane has been overtaken and driven back to a hangar, its owner must toss up a "six" before it can come out again. It is brought out on to the nearest square E to resume its journey again. If overtaken before it has passed any "hangar" it is driven back to its aerodrome and cannot get out until a "five" is tossed up.

(5) A plane that has been right around the coast towns and is coming up toward the center should avoid getting into "the ditch" i. e. the triangle representing the home of an opponent, or else a plane of his opponent coming up on the opposite side and getting into its own home may drive the intruder back all the way to its aerodrome from which it must again start afresh after a "five" is tossed up by its owner.

(6) If an opponent's aeroplane happens to be on your "starting point" square you cannot bring out a fresh plane but you can compel him to move his plane out of the way as soon as he casts up "one".

(7) When a plane has gone around halfway or about halfway it is advisable to stick a distinguishing device such as a flag or a pin G on it so as to avoid confusion, (by the time it gets back to its starting point ready to go down the center), between it and newly started planes.

(8) The games can, if desired, be played in partnerships. In this case a player may forfeit a move rather than overtake and drive back a plane of his partner, except when he is on the starting point of an opponent and casts up "one". The two highest and two lowest in casting the dice should be partners and they should sit opposite each other: the one who tosses the highest number of all begins the game. When playing in partnerships the first to get all his planes home score 4, the second 3, and the third 2, so that the first home may not always be on the winning side. This rule is important when a rubber game is played.

I declare that what I claim is:—

1. A board racing game and appliances for playing same, comprising pieces representing some type of racer; dice; a distinguishing device to be applied to the racing pieces to indicate that they have traveled over a certain length of their course; and a board having small squares arranged to form a course for the race and marked with the names of geographical entities and instructional data, certain of the small squares at regular intervals being distinctively colored; four large corner squares differing from each other in color and provided with indications of educational value relative to the geographical entities represented by the small squares; a center square divided into four triangles colored to correspond to the large corner squares; and oblong areas of a distinctive color abutting on the said central triangles and marked to the type of racing pieces.

2. In a game apparatus, the combination of a board; a plurality of contrastingly colored triangular spaces located centrally thereof, said triangles abutting and forming a square; a pair of oblong spaces extending outwardly from the base of each triangle at right angles thereto, said oblongs being spaced apart; a map located in each corner of the board, said maps depicting the same country with different educational matter appearing thereon, the background of the maps corresponding respectively to the ground color of the centrally disposed triangles; a race course depicted by a continuous series of relatively small squares extending around the board and maps, said squares in part being distinctively colored to denote safety zones, with a lateral series of such squares extending inwardly from the centrally disposed square
5 of the continuous series at each edge of the board, said lateral series passing between the oblong spaces aforesaid and terminating at the base of the triangles, all of said squares bearing the name of a town which
10 may be located on the maps; and a plurality of series of playing pieces, each separate series being colored to correspond to one of the triangular spaces.

In witness whereof I have hereunto signed my name this 7th day of October, 15 1918, in the presence of two subscribing witnesses.

JEREMIAH WILLIAMS.

Witnesses:
 JOHN LLEWELYN JONES,
 JOSEPH WILLIAM PARSONS.